United States Patent [19]
Upmeier

[11] 3,860,380
[45] Jan. 14, 1975

[54] APPARATUS FOR MAKING, FLATTENING AND HAULING-OFF BLOWN TUBULAR PLASTICS FILM

[75] Inventor: Hartmut Upmeier, Tecklenburg, Germany

[73] Assignee: Windmoller & Holscher, Munsterstrasse, Germany

[22] Filed: Nov. 20, 1972

[21] Appl. No.: 307,868

[30] Foreign Application Priority Data
Nov. 24, 1971 Germany............................ 2158337

[52] U.S. Cl. .............................. 425/326 B, 425/455
[51] Int. Cl............................................ B29d 23/03
[58] Field of Search ............. 425/326, 72, 377, 455, 425/326 B

[56] References Cited
UNITED STATES PATENTS

| | | | |
|---|---|---|---|
| 2,337,927 | 12/1943 | Reichel et al................... | 425/326 X |
| 3,008,186 | 11/1961 | Voigt.................................. | 425/326 |
| 3,161,942 | 12/1964 | Cheney........................... | 425/455 X |
| 3,337,665 | 8/1967 | Underwood et al. ........... | 425/387 X |
| 3,456,044 | 7/1969 | Pahlke ............................ | 425/326 X |
| 3,466,356 | 9/1969 | Carlson, Jr. et al. ........... | 425/327 X |

Primary Examiner—Richard B. Lazarus
Attorney, Agent, or Firm—Fleit & Jacobson

[57] ABSTRACT

Apparatus for making, flattening and hauling-off blown tubular plastics film comprising an extruder for producing the film. a vertically-upwardly operative blowhead for inflating the film with air, first flattening plates for the film provided vertically above the blowhead downstream of a position at which the film has solidified, direction-changing mechanism including two direction-changing rolls at a spacing from one another for diverting the film through 180°, the direction-changing rolls being grooved to permit the passage of inflating air from the blowhead, second flattening plates for the film, including squeeze rolls, disposed at a spacing from the vertically below the downstream end of the direction-changing mechanism, and supporting cylinders located between the direction-changing rolls for limiting inflation of the film. The first flattening plates and the direction-changing mechanism being so arranged that the direction of movement of the film through the direction-changing mechanism is preferably at an acute angle to the direction in which the film leaves the extruder.

3 Claims, 3 Drawing Figures

3,860,380

APPARATUS FOR MAKING, FLATTENING AND HAULING-OFF BLOWN TUBULAR PLASTICS FILM

The invention relates to an improvement in or modification of the apparatus described and claimed in our Patent Application Ser. No. 172,520, now U.S. Pat. No. 3,804,571 for making, flattening and hauling off blown tubular plastics film.

In our said parent application, we have described and claimed such an apparatus comprising an extruder for producing the film, a vertically-upwardly operative blowhead for inflating the film with air, first flattening means for the film provided vertically above the blowhead downstream of a position at which the film has solidified, direction-changing means including a direction-changing roll or rolls for diverting the film through 180°, the direction-changing roll or rolls being grooved to permit the passage of inflating air from the blowhead, and second flattening means for the film, including squeeze rolls, disposed at a spacing from and vertically below the downstream end of the direction-changing means. Such an apparatus permits a reduction in the height of the factory in which it is installed or, for a given factory height, permits the cooling path to be extended so as to increase the maximum haul-off speed. The parent application also describes coiling means for the film provided downstream of the second flattening means, the coiling means being mounted for continuous or oscillating rotary motion for the purpose of distributing longitudinally-extending errors in the thickness of the film.

The present invention aims to provide a saving in, or better utilization of, the floor area taken up by the entire equipment.

According to the invention, in an apparatus as aforesaid and wherein the direction-changing means comprise two direction-changing rolls at a spacing from one another and supporting cylinders located therebetween for limiting inflation of the film, the first flattening means and the direction-changing means are so arranged that the direction in which the film passes through the direction-changing means is preferably at an acute angle to the direction in which the film leaves the extruder. By means of the invention, it is possible to mount the coiling means (irrespective of whether the second flattening means are stationary or given a continuous or oscillating rotation) at any desired position around the blowhead.

To permit even further freedom of scope in the relative arrangement of the extruder and coiling means, the winding axis of the coiling means may be disposed at an angle to the plane of the first flattening means. In this case it is necessary that the bubble of inflated film between the direction-changing means and the second flattening means be formed cylindrically, as is already disclosed in the parent application, because flattening in the second flattening means takes palce in a plane that is different from that of the flattening effected by the first flattening means. In the embodiments shown in the parent application, however, the cylindrical inflation of the film that takes place between the direction-changing means and the second flattening means is necessary only because of the rotation of the coiling means or the rotary oscillation of the second flattening means.

Figure 1:
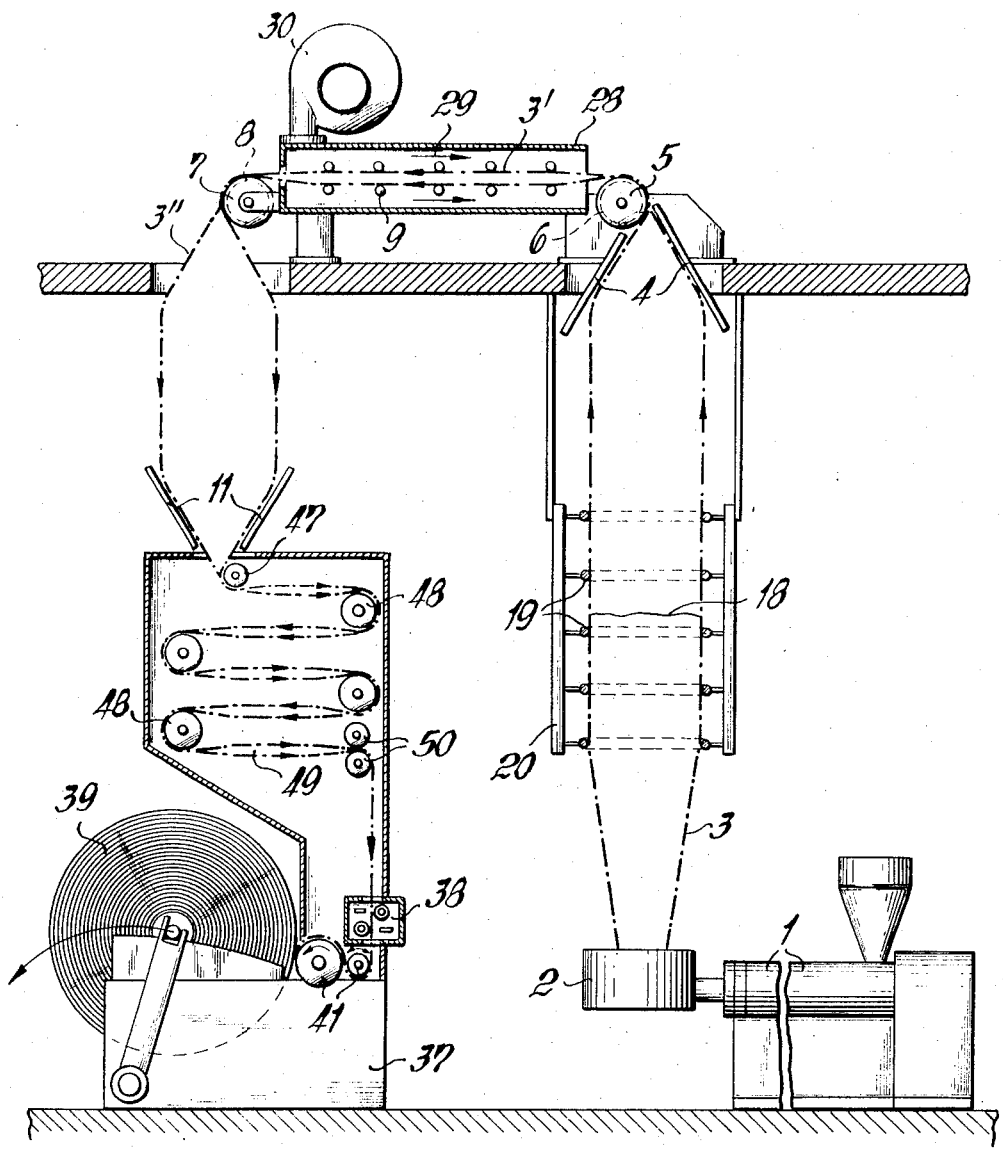
FIG. 1 is a diagrammatic side elevation, similar to FIG. 2 of the in the above-noted patent of an apparatus for making, flattening and hauling off blown tubular plastics film.

Referring to FIG. 1, a screw extruder 1 equipped with a blowhead 2 forms tubular plastic film in the form of an upwardly directed bubble 3. At the location indicated by the line 18 where the plastic film solidifies, the bubble 3 is supported and calibrated by supporting ring segments 19 which are provided with a readily rotatable covering and which are adjustable in diameter. Teh bubble 3 passes to first flattening means comprising stationary flattening plates 4 and the flattened film is then diverted by direction-changing means comprising a first direction-changing roll 5 provided with grooves 6 and a second direction-changing roll 7 provided with grooves 8, the film thereafter being fed vertically downwardly, i.e., in a direction parallel and opposite to the direction in which it leaves the blowhead 2. The grooves 6, 8 in the direction-changing rolls enable the air from the blowhead to inflate the portion 3' of the film between the direction-changing rolls and to inflate the film to a further bubble 3" downstream of the direction-changing means. Auxiliary cylinders 9 limit the degree of inflation between the direction-changing rolls 5, 7. The film between the cylinders 9 is surrounded by a cooling jacket 28 through which cooling air is forced by a fan 30, preferably in the direction of the arrows 29, namely in countercurrent to the feeding direction of the film through the direction-changing means.

Downstream of the direction-changing means, the reinflated film bubble 3" is flattened by second flattening means comprising flattening plates 11, the flattened film lying parallel to the axis of a coil 39 into which the film is subsequently wound. Downstream of the flattening plates 11, the film passes over a direction-changing cylinder 47 towards contact cooling cylinders 48 about which the film is passed in a circuitous path, air cushions 49 being formed between adjacent cylinders 48. Finally, the film passes between a pair of squeeze cylinders 50 to a pre-treating station 38 for printing, around haul-off rolls 41 of a stationary coiling device 37 and onto the coil 39.

Figure 2:
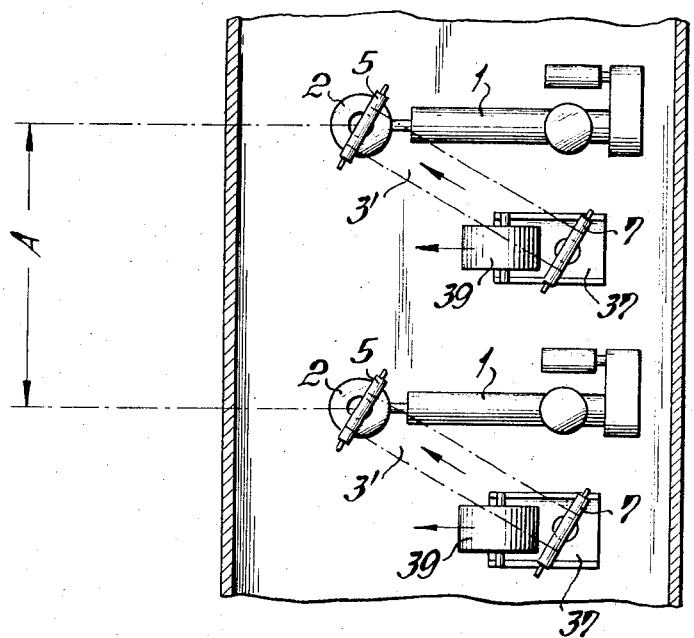
FIG. 2 is a plan view showing a first example of an arrangement of the components in accordance with the present invention.
Figure 3:
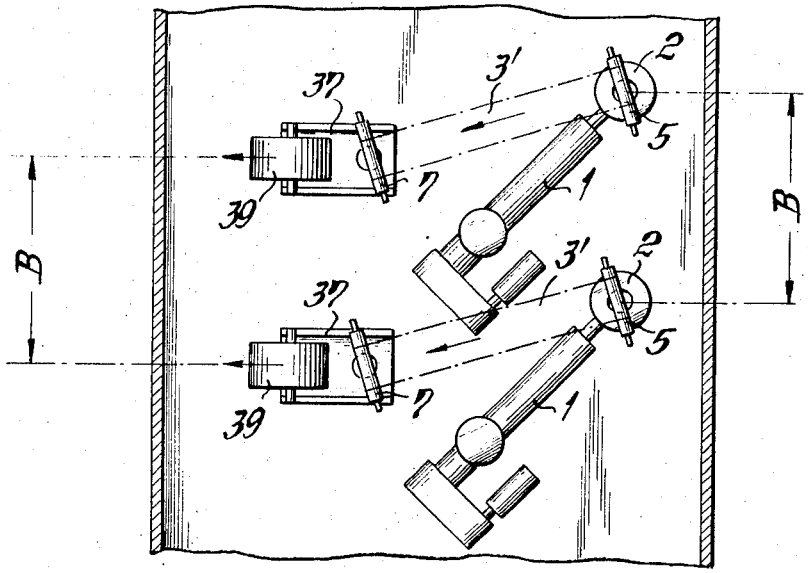
FIG. 3 is a view similar to FIG. 2 but of a modified arrangement.

Referring now to FIGS. 2 and 3, these show two different examples of arrangements for the extruder 1 with blowhead 2, the direction-changing rolls 5 and 7 with the film 3' therebetween, and the coiling device 37. In the FIG. 2 example, each extruder 1 is parallel to its associated coiling device 37 whereas in FIG. 3 the extrusions 1 are oblique and the coiling devices 37 straight. By a conparison of the spacings A and B in FIGS. 2 and 3 respectively, it will be noted that the FIG. 3 arrangement permits closer juxtapositioning of two apparatuses according to the invention as the first flattening means and the direction-changing means are so arranged that the direction of movement of the film through the direction changing means is preferably at an acute angle to the direction in which the film leaves the extruder.

If only the plates 4 of the first flattening means and the direction-changing roll 5 associated with these first flattening means are so disposed in relation to the extruder 1 that the film is passed to one side either obliquely or at right-angles, whereas the turning axis of the coiling device extends parallel to the direction-changing roll 8, then the coiling device will always extend radially to the axis of the blowhead 2. In that case there is no need to reinflate the film as a bubble 3″ downstream of the direction-changing means. The film may then be kept flat by means of auxiliary cylinders similar to the cylinders 9.

I claim:

1. Apparatus for making, flattening and hauling-off blown tubular film composed of plastic material comprising an extruder and vertically-upwardly operative blowhead means for receiving and inflating the plastic material with air to form film, the extruder portion of said extruder and blowhead means having a substantially horizontal longitudinal axis, first flattening means for the film provided vertically above the extruder and blowhead means downstream of a position at which the film has formed and solidified, direction-changing rolls at a spacing from one another for diverting the film through 180°, the direction-changing rolls being grooved to permit the passage of inflating air from the extruder and blowhead means, second flattening means for the film, includng squeeze rolls, disposed at a spacing from and vertically below the downstream end of the direction-changing means, and supporting cylinders located between the direction-changing rolls for limiting inflation of the film, wherein the first flattening means and the direction-changing means are so arranged that a substantially vertical plane to the direction of movement of the film and through the direction-changing means is at an angle other than 0° or 180° to the direction of the longitudinal axis of the extruder portion of the extruder and blowhead means.

2. Apparatus according to claim 1, wherein the axis of coiling means for the film downstream of the second flattening means is disposed at an acute angle to the plane of the first flattening means.

3. A plurality of apparatus for making, flattening and hauling-off blown tubular plastic film, each said apparatus comprising an extruder having a substantially horizontal longitudinal axis for extruding plastic material, a vertically-upwardly operative blowhead mounted to said extruder for receiving and inflating the plastic material with air to form film, first flattening means for the film provided vertically above the blowhead downstream of a position at which the film has solidified, direction-changing means including two direction-changing rolls at a spacing from one another for diverting the film through 180° positioned above and downstream of said first flattening means, the direction-changing rolls being grooved to permit the passage of inflating air from the blowhead, second flattening means for the film including squeeze rolls, disposed at a spacing from and vertically below the downstream end of the direction-changing means, and supporting cylinders located between the direction-changing rolls for limiting inflation of the film so that a substantially vertical plane to the axis of the film moving through the direction-changing means forms an acute angle with the direction of the longitudinal axis of the extruder.

* * * * *